MEASURING SYSTEMS WITH COMMON-MODE INTERFERENCE SUPPRESSION

Filed May 21, 1965 4 Sheets-Sheet 1

June 4, 1968 D. W. FLEISCHER ET AL 3,387,224

MEASURING SYSTEMS WITH COMMON-MODE INTERFERENCE SUPPRESSION

Filed May 21, 1965 4 Sheets-Sheet 2

June 4, 1968 D. W. FLEISCHER ET AL 3,387,224

MEASURING SYSTEMS WITH COMMON-MODE INTERFERENCE SUPPRESSION

Filed May 21, 1965 4 Sheets-Sheet 4

United States Patent Office 3,387,224

Patented June 4, 1968

3,387,224

MEASURING SYSTEMS WITH COMMON-MODE INTERFERENCE SUPPRESSION

Donald W. Fleischer, Ambler, Murray Garden, Oreland, and William P. Hamilton, North Wales, Pa., assignors to Leeds & Northrup Company, a corporation of Pennsylvania Filed May 21, 1965, Ser. No. 457,610
18 Claims. (Cl. 330—30)

Figure 1:
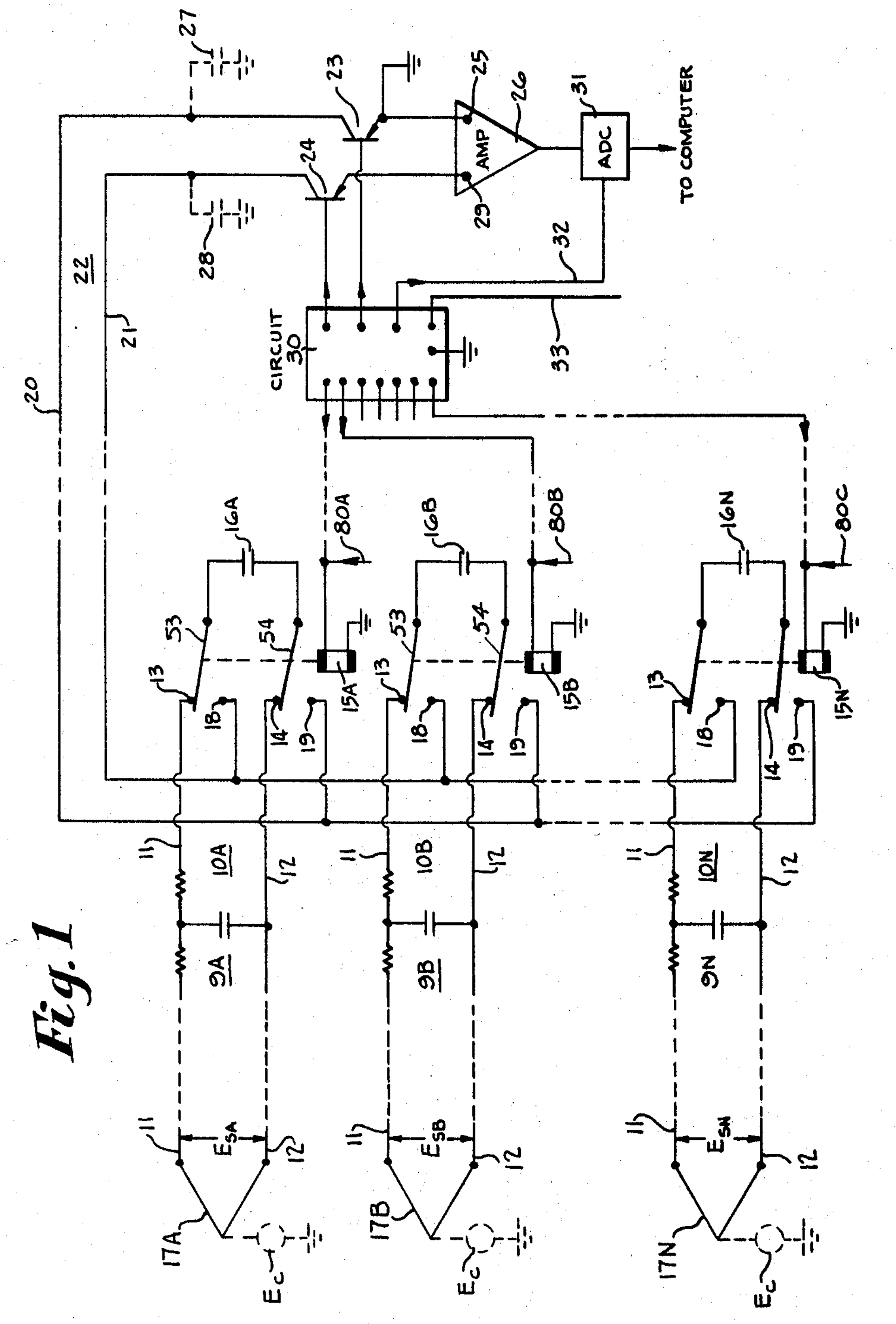

This invention relates to measuring systems, and especially to the suppression of common-mode interference in analog-input systems particularly those operating at high speed with low-level input signals.

In the measurement of analog signals, the common-mode voltage appearing on the conductors of a transmission line from an amplifier to the analog-input channel or channels is a troublesome source of measurement error having random magnitude and often large enough to overload or even break down the amplifier. Such common-mode voltage exists whenever the input channel conductors and/or components are coupled to disturbing electrical fields or circuits, for example, by stray capacitance to ground of the conductors of the transmission line.

In accordance with the present invention, except at time for measurement, the transmission line is disconnected from the input circuit of the amplifier and the analog signal of each input channel is stored in a capacitor whose capacitance is many times greater by large factor N than the stray capacitance to ground of the transmission-line conductors. At time for measurement, the storage capacitor of the selected channel is transferred by suitable switching means, such as a relay, from connection with its channel to connection with the transmission line: during such transfer, there may be momentary connection, direct or via the capacitor between the analog-input channel and one or the other conductors of the transmission line so causing appearance thereon of a common-mode voltage. After completion of the transfer, first one conductor of the transmission line is grounded to short out any common-mode voltage on its stray capacitance to ground and then there is completed connection of the transmission line to the input circuit of the amplifier for application thereto of the stored analog signal with any error due to common-mode voltage on the other conductor of the transmission line attenuated at least by the aforesaid large factor N.

More specifically, in one form of the invention suited for installations having low stray capacitance between the analog-input channels and the transmission line, a single-ended amplifier having a grounded and an ungrounded input terminal may be used. In such cases, a pair of normally-open switches may be provided to connect the ungrounded conductors of the transmission line respectively to the grounded and ungrounded input-terminals of the amplifier in proper sequence under control of timed-actuating means operative upon energization of any of the transfer relays.

In another form of the invention suited for installations whose analog-input channels have high stray capacitance to the transmission line, a differential amplifier having a pair of ungrounded input terminals and a grounded common input terminal should be used. In such cases, a pair of normally-open switches is provided for connection of the ungrounded conductors of the transmission line to the ungrounded input terminals of the amplifier and a third normally-open switch is provided for momentary connection of one of the ungrounded conductors of the transmission line to ground. After a selected storage capacitor has been transferred to the transmission line for measurement of the corresponding analog signal, first, the third normally-open switch is closed to short out any common-mode voltage on said one of the transmission-line conductors for purposes similar to that previously described; and then, after reopening, or during continued closure, of that switch, the pair of normally-open switches is closed to apply the stored signal to the differential input circuit of the amplifier with any error due to common-mode voltage on the other conductor of the transmission line attenuated at least by the large factor N. In both forms of the invention, control of the switches in proper sequence may be actuated by timed actuating means operative upon energization of any of the transfer relays or equivalent switching means.

The invention further resides in circuitry whose components and interconnections have features of novelty and utility hereinafter described and claimed.

Figure 2:
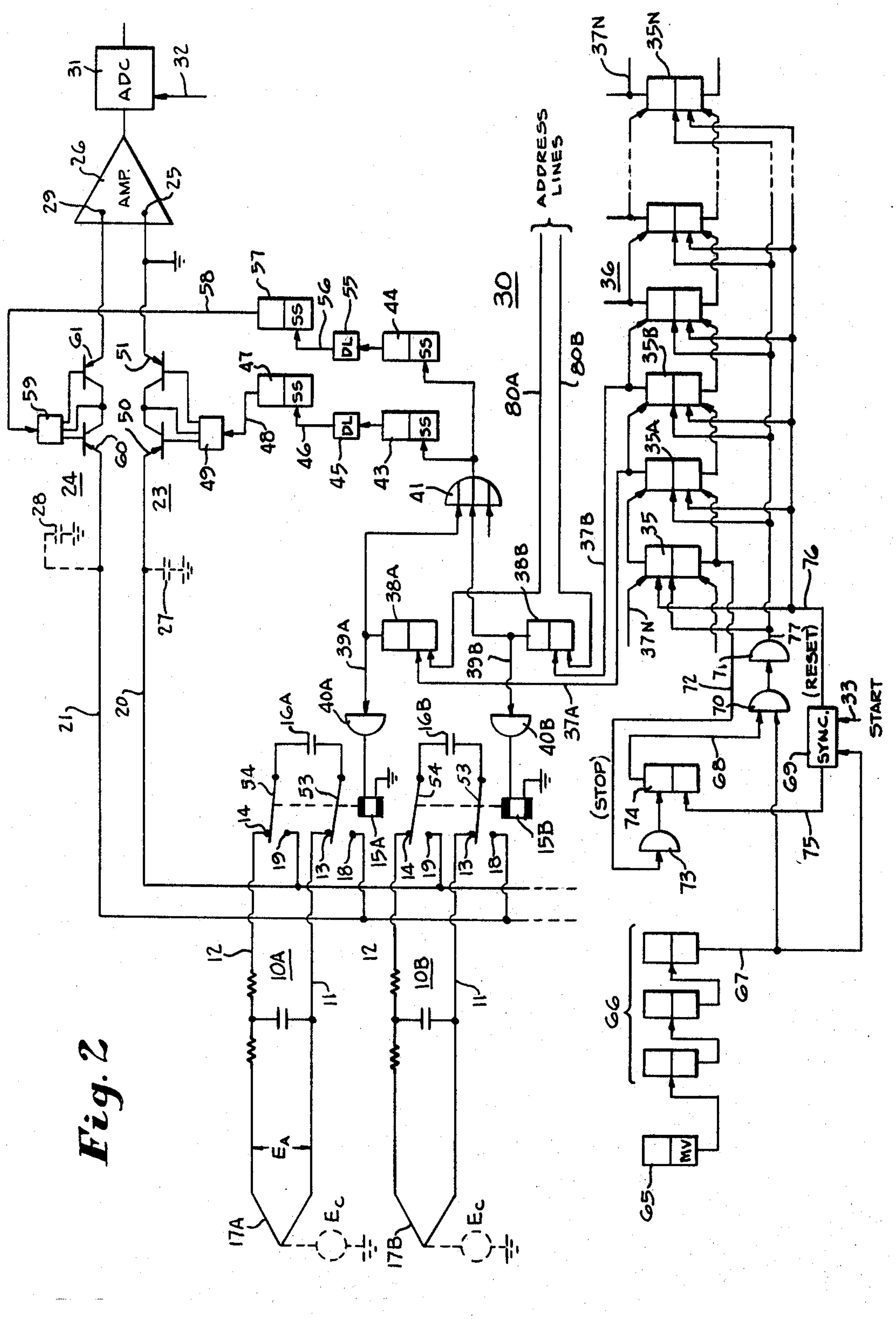
Figure 3:
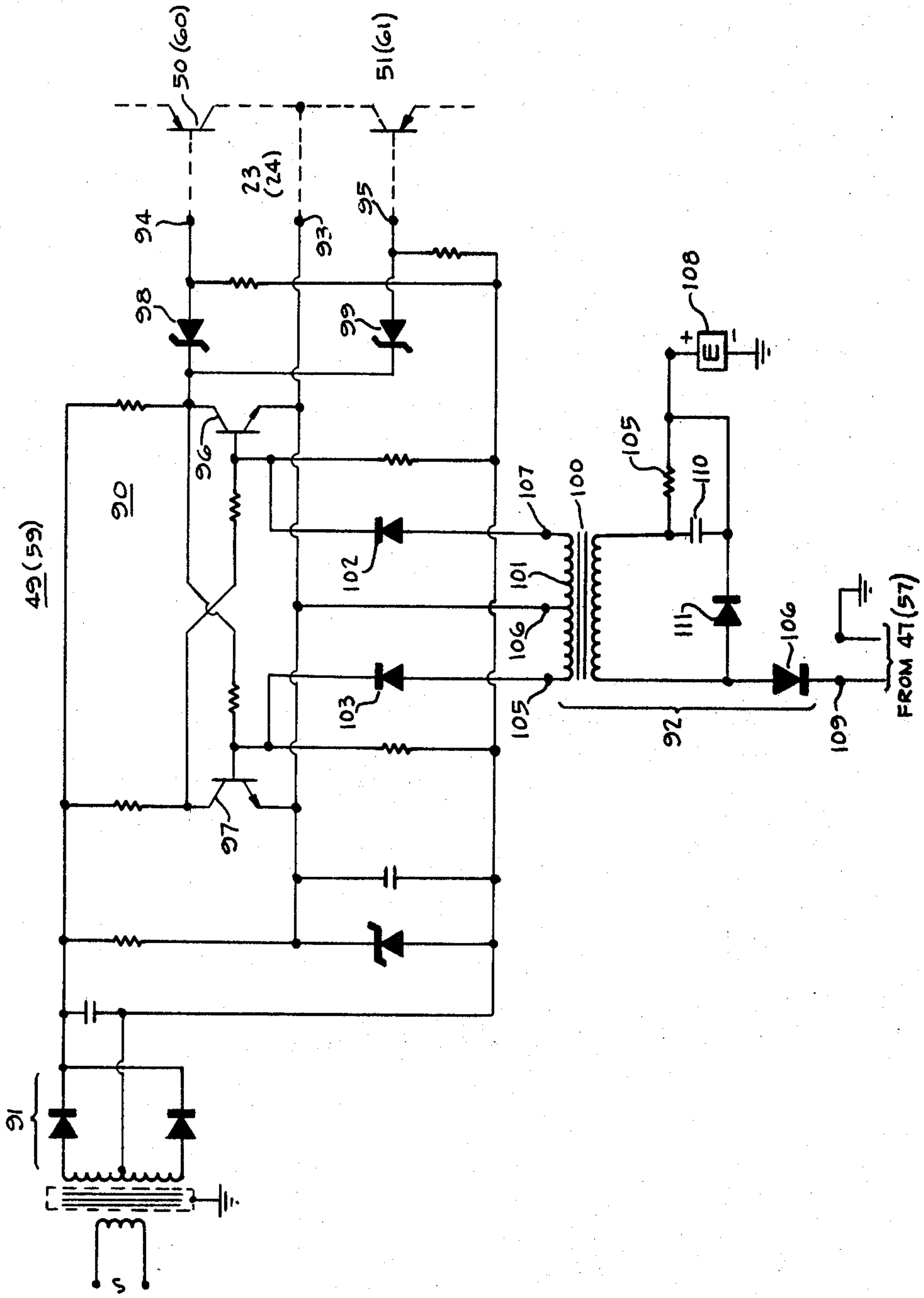
Figure 4:
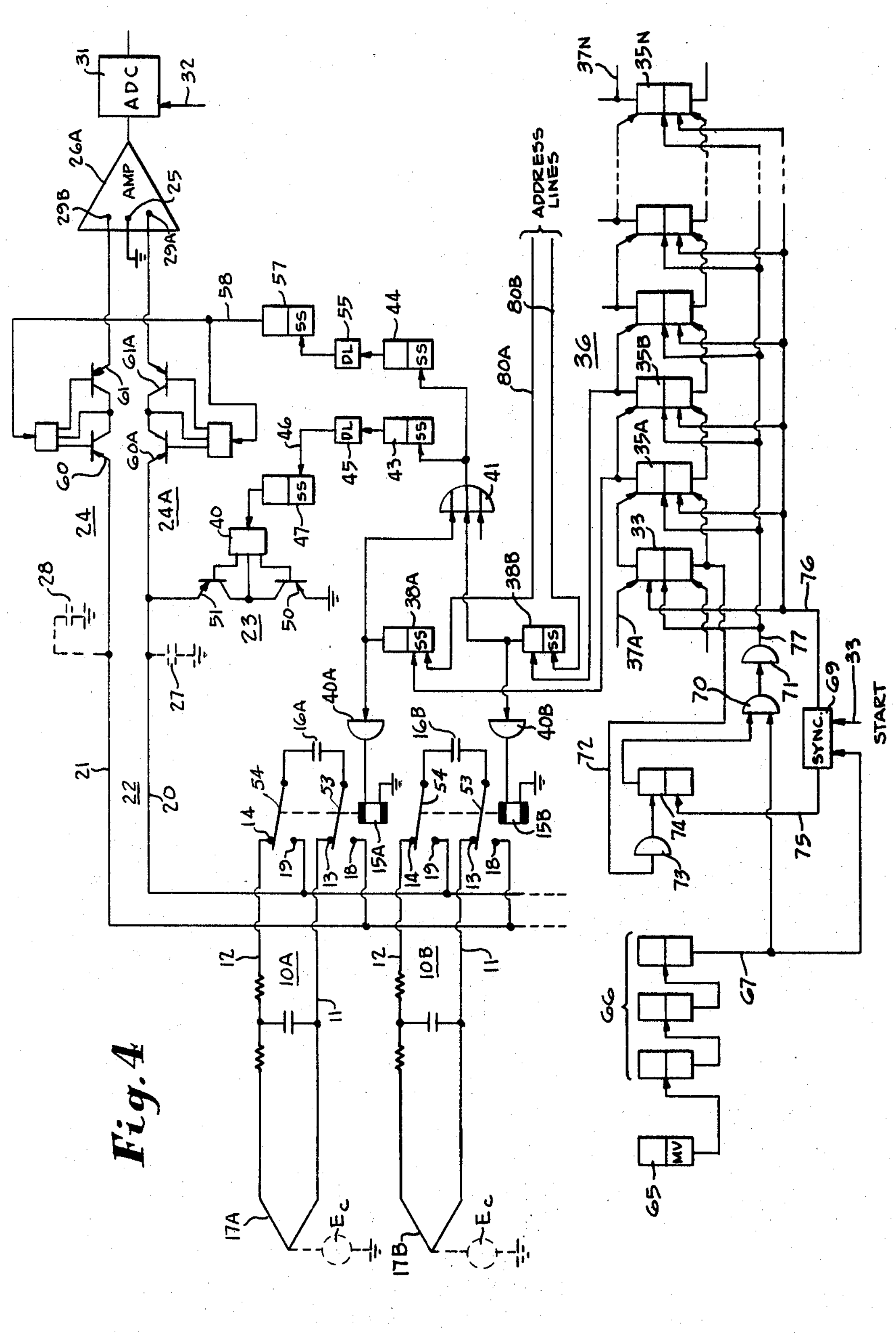

For a more detailed understanding of the invention, reference is made to the following description of preferred embodiments thereof and to the accompanying drawings in which:

FIG. 1 schematically and partly en bloc illustrates one form of the invention utilizing a single-ended amplifier;

FIG. 2 schematically shows the system of FIG. 1 with binary circuitry for control-operation of the transfer relays and the transmission-line switches;

FIG. 3 schematically shows solid-state driver circuitry suited for transistor type of transmission-line switches; and FIG. 4 schematically illustrates another form of the invention utilizing a differential amplifier.

In the system shown in FIG. 1, the analog-input channels 10A–10N respectively include analog-signal sources 17A–17N for producing a DC signal representative of a condition under measurement. For example, the source may be a transducer which produces a DC signal of fixed polarity and of magnitude representative of temperature, pressure or the like; or it may be a balanceable measuring network such as a bridge or potentiometer providing a DC signal of polarity depending upon the sense of unbalance and of magnitude representing the magnitude, or change in magnitude, of a measured variable.

The conductors 11, 12 of the analog channels 10A–10N extend to a bank of relays 15A–15N, or equivalent switching means, located at a measuring station and are coupled to stray fields or circuits constituting a source $E_C$ of the so-called common-mode interference. The filters 9A–9N in each channel near the transfer relays attenuate the AC component of undesired differential voltage pick-up but are ineffective to reject or suppress the common-mode interference which may arise when a channel is transferred to connection with the transmission line 22.

In FIG. 1, the conductors 11, 12 of each of the analog-input channels 10A–10N are respectively connected to the normally-closed contacts 13, 14 of a corresponding one of the transfer relays 15A–15N. Accordingly, except during a measurement, each of the signal storage capacitors 16A–16N is charged to a DC voltage corresponding in polarity and magnitude with the output of the associated one of the signal sources 17A–17N. For reasons subsequently discussed, the value of each of storage capacitors 16A–16N is selected to be substantially greater than the stray capacitances 27, 28 between the transmission-line conductors 20, 21 and ground. By way of example, the value of each capacitor 16A–16N may be 1,000 $\mu$f. which is typical installations is $10^6$ or more times greater than that of the stray capacitances 27, 28 (i.e. the factor N is of a magnitude of $10^6$); the leakage resistance of each of these capacitors should be high, for example, above 5 megohms.

The normally-open contacts 18, 19 of each of transfer relays 15A–15N are respectively connected to the ungrounded conductors 20, 21 of the transmission line 22. In consequence, when any one of transfer relays 15A–15N is energized, the corresponding one of storage capacitors 16A–16N is disconnected from the associated analog-input channel by separation of the movable relay contacts 53, 54 from the normally-closed contacts 13, 14 and is connected across transmission line 22 by engagement of the movable relay contacts 53, 54 with the normally-open contacts 18, 19. During such transfer of the signal-storage capacitor from the associated analog-input channel to transmission line 22, the stray capacitances 27, 28 of the line may be charged via the relay from the so-called common-mode voltage source $E_C$. For example, during transfer, contact 13 may still be closed after contact 19 has been closed; or during transfer, there may be a transitory connection directly between contacts 13, 18 and/or contacts 14, 19, particularly when the relays are of the mercury-wetted type. The resulting charge on one or the other of the capacitances 27, 28 depends in polarity and magnitude upon the polarity and magnitude of the common-mode voltage $E_C$ at the time of transfer. Should the stray capacitances 27 or 28 of the transmission line 22 be charged via the relay as described above, the error introduced on the signal-storage capacitor is of the tolerable value $E_C/N$.

While the transfer relay remains energized and after brief delay, sufficient to insure that both contacts 18, 19 have been closed, the normally-open switch 23 is closed to connect transmission line conductor 20 to the grounded input terminal 25 of the single-ended amplifier 26. Such connection shunts the stray capacitance 27 of conductor 20 and so short-circuits the common-mode voltage on it. After closure of switch 23, a second normally-open switch 24 is closed to connect the other transmission line conductor 21 to the ungrounded input terminal 29 of amplifier 26 so to apply the analog signal stored on the capacitor to the amplifier input circuit, plus an error caused by the common-mode voltage on conductor 21 but attenuated at least by the aforesaid large factor N.

Selective energization of relays 15A–15N and sequential closure of switches 23, 24 during the energization period of each relay may be effected under control of a timing circuit 30. The analog output of amplifier 26 may be applied to an analog-to-digital converter 31 whose successive cycles may be initiated by an ADC Start pulse supplied over line 32 from the timing circuit 30.

Suitable circuitry for the timing circuit 30 of FIG. 1 is shown in FIG. 2. It provides for either of two modes of sampling the outputs of a plurality of analog channels. In one mode, the relays 15A–15N are energized in turn in a repeating sequence under control of a ring counter 36, or equivalent; in the other mode, the relays 15A–15N may be selectively energized by address lines 80A–80N in accordance, for example, with any desired programming of a computer. In the sequential mode of control, each of relays 15A et seq. is in turn energized when a 1 signal is advanced to a corresponding one of the stages 35A et seq. of ring counter 36. For example, when stage 35A is set by a 1 signal, the output signal appearing on line 37A is effective to initiate a cycle of the single-shot multivibrator 38A. Until the multivibrator 38A reverts to its original state at conclusion of its cycle, the signal level on its output line 39A as applied to driver amplifier 40A is effective to energize the relay 15A. In consequence, as above described, the signal-storage capacitor 16A is transferred from connection with analog-input channel 10A to connection with transmission line 22.

The ON signal on output line 39A of multivibrator 38A is also applied via the OR-gate 41 to the two single-shot multi-vibrators 43, 44. After a brief interval $T_1$, induced by delay line 45 or equivalent, the output signal of multivibrator 43 as appearing on line 46 is effective to initiate a cycle of single-shot multivibrator 47. The interval $T_1$ is sufficiently long to insure that capacitor 16A has been connected via relay contacts 19, 54 of relay 15A to conductor 20 of transmission line 22. The signal appearing on output line 48 of multivibrator 47 at the end of interval $T_1$ is applied to the driver amplifier 49 to close the switch 23 between conductor 20 of the transmission line and the grounded input terminal 25 of amplifier 26. As previously described in discussion of FIG. 1, the closure of switch 23 short-circuits the stray capacitance 27 and so precludes its common-mode potential, transferred as a result of any momentary connection between the analog-input channel and said transmission-line conductor, from affecting the amplifier input.

Preferably, and as shown in FIGS. 2 and 3, the switch 23 comprises two transistors 50, 51 whose collector electrodes are connected back-to-back in series between transmission-line conductor 20 and grounded input terminal 25 of amplifier 26. With no input signal to driver amplifier 49, the collector-base potential of each of transistors 50, 51 maintains them in non-conductive state. The breakdown potential of the switching transistors 50, 51 when of the 2N1234 type is about 150 volts—well above the maximum common-mode voltage usually appearing on stray capacitance 27. The transistors 50, 51 are switched to conductive state when the multivibrator 47 provides an input signal for the driver amplifier 49.

The delay line 55, or equivalent, in the output line 56 of multivibrator 44 provides an interval $T_2$ before the single-shot multivibrator 57 is turned ON after start of energization of relay 15A. The interval $T_2$ is somewhat greater than $T_1$ and is sufficiently long to insure that both contacts 18, 19 of relay 15A have been closed. The signal appearing on output line 58 of multivibrator 57 at the end of interval $T_2$ is applied to the driver amplifier 59 to close the switch 24 between conductor 21 of the transmission line and the ungrounded terminal 29 of the amplifier 26.

As shown in FIGS. 2 and 3, the switch 24 also comprises two transistors 60, 61 which may be of the 2N1234 type. The collector electrodes of transistors 60, 61 are connected back-to-back in series between the load end of transmission line conductor 21 and the ungrounded input terminal 29 of amplifier 26. With no input signal to driver amplifier 59, the collector-base potential of each of transistors 60, 61 maintains them in non-conductive state. The breakdown potential of these switching transistors is also well above the maximum common-mode voltage normally appearing on stray capacitance 28. The transistors 60, 61 are switched to conductive state (i.e., switch 24 closed) when the multivibrator 57 provides an input signal for driver amplifier 59.

As previously described in discussion of FIG. 1, the closure of switch 24 completes the connection of capacitor 16A across the input terminals 25, 29 of amplifier 26 via transmission line 22 and also connects the stray capacitance 28 of that line effectively in shunt to the many times greater capacitance of the analog-signal storage capacitor 16A. Thus, for the series of events described, the DC signal applied to the input circuit of amplifier 26 is accurately representative of the analog output $E_{SA}$. Any measurement error, due to a common-mode charge on the stray capacitances 27, 28 of the transmission line is attenuated at least by the factor N having a value of the order of a million or more.

Before the next stage 35B of the ring counter 36 is turned ON, all of the single-shot multivibrators 43, 44, 47, 57 for the driver amplifiers 49, 59, as well as the single-shot multivibrator 38A, have completed their cycles and are on standby in readiness for application of the analog output of channel 10B to amplifier 26.

When stage 35B is turned ON, its output signal on line 37B initiates a cycle of the single-shot multivibrator 38B so to provide on its output line 39B a binary signal effective to energize relay 15B via its driver amplifier 40B and also effective via OR-gate 41 to initiate a cycle of each of multivibrators 43, 44. There is thus initiated a second series of events during which in sequence the second storage capacitor 16B is transferred by the contacts of relay 15B from the analog channel 10B to the receiving end of transmission line 22; the switch 23 is closed to discharge the stray line capacitance 27 and switch 24 is closed to apply the analog signal on capacitor 16B to the input circuit of amplifier 26 concurrently with attenuation of any common-mode voltage on stray capacitance 29 by at least the large factor N. In like manner, as each of the subsequent stages 35C–35N of ring counter 36 is in turn set to the ON state, the corresponding one of relays 15C et seq. is energized for a brief period during which the associated capacitor applies its stored analog signal to amplifier 26 via transmission line 22 and during which the switches 23, 24 are closed in sequence to suppress any common-mode voltages on the stray capacitances 27, 28 of the transmission line 22.

In the particular ring counter 36 shown in FIG. 2, the resetting of the last stage 35N shifts a 1 signal into the idler stage 35 in readiness for the next series of sequential samplings of the analog outputs of channels 10A–10N. When the idler stage 35 is so set, the output on its line 72 provides, via inverter 73, a Stop signal for the flip-flop 74.

The pulses for advancing a 1 signal step-by-step through the successive stages of ring counter 36 may be derived from a free-running multivibrator 65 via a frequency-divider or counter 66. The clock or timing pulses on the output line 67 of counter 66 are applied to one input terminal of AND-gate 70 but are not passed by that gate unless its other input circuit is enabled by an output on line 68 from flip-flop 74. The pulses on output line 67 of counter 66 are also applied to the synchronizer 69 but are ineffective to operate the ring counter 36 in absence of a Start signal on input line 33 of synchronizer 69. With one flip-flop of the synchronizer set by a Start signal (derived, for example, by a computer program), the subsequent clock pulse sets the other flip-flop of the synchronizer. The resulting output on line 75 turns ON the flip-flop 74 so to enable gate 70 to pass subsequent clock pulses via inverter 71 to the shift line 77 of the ring counter stages so to advance the 1 signal—one stage per pulse. As above stated, the flip-flop 74 is turned OFF when the last stage 35N shifts a 1 signal into the idler stage 35 at completion of a sequence of analog sampling operations.

The signal appearing on output line 76 of the synchronizer 69 when a Start signal is applied is effective to insure that a 1 appears in the idler stage 35 and that a 0 appears in all of stages 35A–35N before the first clock pulse of a series is passed by gate 70 to the ring counter.

Suitable circuitry for each of the switch drivers 49, 59 is shown in FIG. 3. It comprises a bistable flip-flop circuit 90, a power supply 91 providing the DC currents for operation of flip-flop 90 and a differentiator circuit 92 for deriving trigger pulses for the input circuits of flip-flop 90 from the leading and trailing ends of the pulse output of the associated single-shot multivibrator 47 (or 57). It is to be noted that the flip-flop 90 is floating with respect to ground.

The output terminal 93 of flip-flop 90 is connected to the collectors of both of the associated NPN switching transistors (50, 51 or 60, 61). The output terminals 94, 95 of flip-flop 90 are respectively connected to the bases of the associated pair of switching transistors (50, 51 or 60, 61). The emitter of the normally OFF transistor 96 of flip-flop 90 is connected to output terminal 93 and the collector of that transistor is connected via the Zener diodes 98, 99 to the output terminals 94, 95 respectively. Thus, for the normal or standby state of flip-flop 90, switching transistors (50, 51 or 60, 61) are non-conductive.

When a trigger pulse is applied to the base of the normally OFF transistor 96 of flip-flop 90, it is switched to conductive state, and in consequence the other transistor 97 of flip-flop 90 is turned OFF. With transistor 96 in conductive state, the voltage between output terminal 93 and each of output terminals 94, 95 falls, so to turn ON the associated pair of switching transistors (50, 51 or 60, 61).

When a trigger pulse is applied to the base of the now non-conductive transistor 97, it switches back to its original conductive state, and by usual multivibrator action, switches the transistor 96 back to its original non-conductive state. With transistor 96 again in non-conductive state, the voltage between output terminal 93 and each of the output terminals 94, 95 rises so to turn OFF the associated pair of switching transistors (50, 51 or 60, 61). The Zener diodes 98, 99 are provided to insure abrupt transition from 0 to full-ON value, and vice versa, of the base currents of the switching transistors (50, 51 or 60, 61).

The network 92 for supplying trigger pulses to flip-flop 90 includes a pulse transformer 100. The end terminals 107, 105 of the secondary winding 101 of transformer 100 are connected via diodes 102, 103 to the bases of the flip-flop transistors 96, 97 respectively. For the circuit shown, these transistors are of the NPN type. The center tap of the transformer secondary 101 is connected to the emitters of transistors 96, 97. Before initiation of a cycle of the associated single-shot multivibrator (47 or 57), the circuit between terminal 109 and the negative terminal of source 108 is open.

When a cycle of the associated multivibrator 47 (or 57) is initiated, the circuit between terminal 109 and the negative terminal of source 108 is essentially closed to initiate a flow of current from source 108 through a path including the primary winding 104 of transformer 100 and the isolating diode 106. The resulting rise in primary current of transformer 100 induces a transient voltage across the secondary winding 101. The windings are so poled that the resulting current pulse flows from secondary terminal 107 through diode 102 from base to emitter of transistor 96, and thence back to center tap terminal 106 of secondary winding 101. The application of this pulse, as above described, turns ON transistor 96 to close the transmission-line switch 23 (or 24) and to turn OFF the transistor 97. Upon termination of the cycle of the single-shot multivibrator 47 (or 57), the circuit between terminal 109 and the negative terminal of source 108 is opened. The resulting decay of the magnetic field of transformer 100 produces across the secondary winding 101 a transient voltage of reverse polarity. In consequence, a current pulse flows from secondary terminal 105 through diode 103 from base to emitter of transistor 97, and thence back the center tap 106 of secondary winding 101. The application of this pulse turns transistor 97 ON, so to turn transistor 96 OFF for opening of transmission-line switch 23 (or 24).

The capacitor 110 of network 92 is provided to increase the rate of current rise and fall when the circuit between terminal 109 and the negative terminal of source 108 is closed and opened. The diode 111 is provided to limit the voltage appearing across primary 104 when the circuit between terminal 109 and negative terminal of source 108 is broken.

The arrangement shown in FIG. 2 and above described affords good common-mode suppression for installations in which the total capacitive coupling from the transmission-line conductors to the channel conductors and components is reasonably low. When such stray coupling is of higher value, the arrangement shown in FIG. 4 and using a differential amplifier should be used to afford equally high common-mode suppression. Except for differences below specifically discussed, the modification shown in FIG. 4 is similar to that of FIGS. 1 and 2 and its corresponding elements are identified by the same reference characters.

In FIG. 4, the analog-signal amplifier 26A is a differential amplifier designed for good common-mode rejection and has ungrounded terminals 29A, 29B respectively connectable to the ungrounded conductors 20, 21 of transmission line 22 via the pair of normally-open switches 24, 24A. One of the transmission-line conductors, specifically conductor 20, is connectable to ground via the normally-open switch 23.

Upon energization of any of relays 15A–15N to transfer a corresponding one of analog-storage capacitors 16A–16N to connection across conductors 20, 21 of transmission line 22, the switch 23 is closed under control of single-shot multivibrator 47, to discharge the stray capacitance 27 on which the common-mode voltage may appear. After switch 23 has reopened, or during its continued closure, both of the switches 24, 24A are closed under control of single-shot multivibrator 57 to apply the analog signal stored on the capacitor, via the transmission line 22, across the input terminals 29A, 29B of the amplifier with any common-mode voltage on stray capacitance 28, transferred as a result of any momentary connection between the analog-input channel and the transmission line, attenuated at least by the aforesaid large factor N.

For common-mode suppression of low frequencies approaching DC, the switch 23 is closed only for a brief interval and reopened before closure of switches 24, 24A: to that end the ON-time of the single-shot multivibrator is correspondingly shortened. For common-mode suppression of higher frequencies, for example, power-line frequencies, the switch 23 is first closed and remains closed when switches 24, 24A are closed.

It is to be understood the invention is not limited to the preferred embodiments specifically shown and described but comprehends modifications and equivalents within the scope of the appended claims.

What is claimed is:

1. In a measuring system having at least one signal-storage capacitor normally connected to an analog-input channel, a transmission line, and an amplifier, a common-mode interference-suppression arrangement comprising
first switching means for transferring each storage capacitor from connection with its analog-input channel to connection with said transmission line while said transmission line is disconnected from the input circuit of said amplifier, said storage-capacitor having a capacitance substantially greater by a large factor than the stray capacitance to ground of the conductors of said transmission line,
second switching means operated after said first switching means to ground one conductor of said transmission line to short out any common-mode voltage on its stray capacitance to ground, and
third switching means operated after said second switching means to complete connection of said transmission line to the input circuit of said amplifier for application thereto of the analog signal stored on the capacitor with the error due to any common-mode voltage on the other conductor of said transmission line attenuated at least by said large factor.

2. In a measuring system having at least one signal-storage capacitor normally connected to an analog-input channel, a transmission line, and a single-ended amplifier having grounded and ungrounded input-circuit terminals, a common-mode interference-suppression arrangement comprising
first switching means for transferring each storage capacitor from connection with its analog-input channel to connection with said transmission line while said transmission line is disconnected from the input circuit of said amplifier, said storage capacitor having a capacitance substantially greater by a large factor than the stray capacitance to ground of the conductors of said transmission line,
second switching means operated after said first switching means to connect one conductor of said transmission line to the grounded input terminal of the amplifier to short out any common-mode voltage on the stray capacitance of said one conductor, and
third switching means operated after said second switching means to connect the other conductor of said transmission line to the ungrounded input terminal of said amplifier to apply to the input circuit thereof the analog signal stored in the capacitor with the error due to any common-mode voltage on said other conductor of the transmission line attenuated at least by said large factor.

3. In a measuring system having at least one signal-storage capacitor normally connected to an analog-input channel, a transmission line, and a differential amplifier having a pair of ungrounded input terminals and a grounded input terminal, a common-mode interference-suppression arrangement comprising
first switching means for transferring each storage capacitor from connection with its analog-input channel to connection with said transmission line while said transmission line is disconnected from the input circuit of said amplifier, said storage capacitor having a capacitance substantially greater by a large factor than the stray capacitance to ground of the conductors of said transmission line,
second switching means operated after said first switching means momentarily to connect one conductor of said transmission line to ground to short out any common-mode voltage on the stray capacitance of said one conductor, and
third switching means operated after reopening of said second switching means to connect both conductors of the transmission line respectively to said ungrounded input terminals of the amplifier to apply to the input circuit thereof the analog-signal stored on the capacitor plus any error due to common-mode voltage on the other conductor of the transmission line attenuated at least by said large factor.

4. A measuring system comprising
a plurality of analog-input channels each providing a signal representative of a measured condition,
a transmission line having ungrounded conductors,
a plurality of relays each having normally-closed contacts connected to the conductors of one of said channels and normally-open contacts connected to the ungrounded conductors of said transmission line,
a plurality of signal-storage capacitors each connected across the movable contacts of one of said relays and having a capacitance substantially greater by a factor than the stray capacitance to ground of the ungrounded conductors of said transmission line,
an amplifier having an input circuit for connection to said transmission line,
means for effecting selective energization of said relays to transfer the corresponding signal-storage capacitor from connection to the conductors of the associated analog-input channel to connection within the conductors of said transmission line, and
switching means for connecting said transmission line to said amplifier input circuit including normally-open switches operated during energization of each relay first to short out the common-mode voltage on the stray capacitance of one of said transmission-line conductors, and then to apply the analog signal stored on said signal-stored capacitor by way of said transmission line to the amplifier input circuit plus any error due to the common-mode voltage on the other conductor of said transmission line attenuated at least by said factor.

5. A measuring system as in claim 4
in which the amplifier is a single-ended amplifier having grounded and ungrounded input-circuit terminals, in which the switching means comprises a pair of normally-open switches for connecting the ungrounded conductors of said transmission line respectively to said grounded and ungrounded input-circuit terminals of the amplifier, and which additionally includes switch-control means operative during energization of each relay to effect sequential closure of said pair of switches, first to connect the grounded input terminal of the amplifier to one conductor of the transmission line to short out the common-mode voltage of its stray capacitance, and then to connect the ungrounded input terminal of the amplifier to the other conductor of the transmission line to apply the analog signal stored in the signal-storage capacitor to the amplifier input circuit plus any error due to the common-mode voltage on the other conductor of said transmission line attenuated by said factor.

6. A measuring system as in claim 4 in which the amplifier is a differential amplifier having a pair of ungrounded input terminals and a grounded input terminal, in which the switching means comprises a pair of normally-open switches for connecting the ungrounded conductors of said transmission line to said ungrounded pair of amplifier input-terminals, and a third normally-open switch for grounding one of the ungrounded conductors of said transmission line, and which additionally includes switch-control means operative during energization of each relay, first to effect momentary closure of said third normally-open switch to short out the common-mode voltage on said one of the transmission-line conductors, and then after reopening of said third switch to apply the analog signal on said signal-storage capacitor by way of said transmission line to the differential amplifier input circuit plus any error due to the common-mode voltage on the other conductor of the transmission line attenuated by said factor.

7. A measuring system as in claim 4 in which the means for effecting selective energization of the relays comprises address lines from a command station.

8. A measuring system as in claim 4 in which the means for effecting selective energization of the relays comprises a ring counter whose stages sequentially control the energizing circuits for the relays.

9. A measuring system as in claim 4 in which the normally-open switches are transistor means normally in non-conductive state, and in which the transistor means are switched to conductive state under control of single-shot multivibrators.

10. A measuring system as in claim 5 in which the switch-control means comprises two single-shot multivibrators whose outputs are utilized to effect closure of the respective switches of the pair, and means including delay means effective upon energization of each relay to initiate in proper sequence the respective cycles of said single-shot multivibrators.

11. A measuring system as in claim 6 in which the switch control means comprises a short-period single-shot multivibrator whose output is utilized to effect momentary closure of said third normally-open switch, a second single-shot multivibrator whose output is utilized to effect closure of said pair of normally-open switches, and means including delay means effective upon energization of each relay to initiate a cycle of said short-period single-shot multivibrator and after completion of said cycle to initiate a cycle of said second single-shot multivibrator.

12. A measuring system as in claim 5 in which a plurality of single-shot multivibrators respectively control energization of said relays, the switches of the pair each comprises transistor means normally in non-conductive state, and in which the switch-control means comprises a pair of drivers for switching the respective transistor means to conductive state, each of said drivers comprising a bistable flip-flop, and means including delay means effective upon initiation of a cycle of any of said single-shot multivibrators to produce trigger pulses for said bistable flip-flops to switch said transistor means to conductive state in proper sequence.

13. A measuring system as in claim 6 in which a plurality of single-shot multivibrators respectively control energization of said relays, the switches of the pair each comprises transistor means normally in non-conductive state, the third switch is transistor means normally in non-conductive state, and in which the switch-control means comprises a pair of drivers, one of said drivers controlling the transistor means of said pair of switches and the other of said drivers controlling the transistor means of said third switch, each of said drivers comprising a bistable flip-flop, and means including delay means effective upon initiation of a cycle of any of said single-shot multivibrators to produce trigger pulses for said bistable flip-flops to switch the state of said transistor means in proper sequence.

14. The method of suppressing common-mode interference in a measuring system having a plurality of signal-storage capacitors, each normally connected to an analog-input channel, a transmission line, and an amplifier which comprises selecting for each of said storage capacitors a large capacitance value substantially greater by a large factor than the stray capacitances to ground of the conductors of said transmission line, transferring a selected signal-storage capacitor from connection with its analog-input channel to connection with said transmission line while said line is disconnected from the input circuit of said amplifier, thereafter grounding one conductor of said transmission line to short out any common mode voltage on its stray capacitance to ground, and thereafter completing connection of the transmission line to the input circuit of the amplifier for application thereto of the stored analog signal with the error due to any common-mode voltage on the other conductor of the transmission line attenuated by at least said large factor.

15. The method of suppressing common-mode interference in a measuring system having a plurality of signal storage capacitors, each normally connected to an analog-input channel, a transmission line, and a single-ended amplifier which comprises selecting for each of said storage-capacitors a capacitance value substantially greater by a large factor than the stray capacitance to ground of the conductors of said transmission line, transferring a selected signal-storage capacitor from connection with its analog-input channel to connection with said transmission line while said line is disconnected from the input circuit of said amplifier, thereafter connecting one conductor of said transmission line to the grounded input terminal of said amplifier to short out any common-mode voltage on its stray capacitance to ground, and thereafter connecting the other conductor of said transmission line to the ungrounded input terminal of said amplifier for application to the input circuit thereof of the analog signal stored in the capacitor with the error due to any common-mode voltage on the other conductor of the transmission line attenuated at least by said large factor.

16. The method of suppressing common-mode interference in a measuring system having a plurality of signal-storage capacitors, each normally connected to an analog-input channel, a transmission line, and a differential-input amplifier which comprises selecting for each of said storage capacitors a capacitance value substantially greater by a large factor than the stray capacitance to ground of the conductors of said transmission line, transferring a selected signal-storage capacitor from connection with its analog-input channel to connection with said transmission line while said line is disconnected from the input circuit of said amplifier, thereafter momentarily grounding one conductor of said transmission line to short out any common-mode voltage on its stray capacitance to ground, and thereafter connecting both conductors of said transmission line respectively to the ungrounded input terminals of said amplifier for application to the differential input circuit thereof of the analog-signal stored in the capacitor and with the error due to any common-mode voltage on the other conductor of said transmission line attenuated at least by said large factor.

17. The method of suppressing common-mode interference in a measuring system having a plurality of signal-storage capacitors, each normally connected to an analog-input channel, a transmission line, and a differential-input amplifier which comprises selecting for each of said storage capacitors a capacitance value substantially greater by a large factor than the stray capacitance to ground of the conductors of said transmission line, transferring a selected signal storage capacitor from connection with its analog-input channel to connection with said transmission line while said line is disconnected from the input circuit of said amplifier, thereafter grounding one conductor of said transmission line to short out any common-mode voltage on its stray capacitance to ground, during continued grounding of said one conductor, and thereafter connecting both conductors of said transmission line respectively to the ungrounded input terminals of said amplifier for application to the differential-input circuit thereof of the analog-signal stored in the capacitor and with any common-mode voltage on the other conductor of said transmission line attenuated at least by said large factor.

18. In a measuring system having at least one signal-storage capacitor normally connected to an analog-input channel, a transmission line, and a differential amplifier having a pair of ungrounded input terminals and a grounded input terminal, a common-mode interference-suppression arrangement comprising first switching means for transferring each storage capacitor from connection with its analog-input channel to connection with said transmission line while said transmission line is disconnected from the input circuit of said amplifier, said storage capacitor having a capacitance substantially greater by a large factor than the stray capacitance to ground of the conductors of said transmission line, second switching means operated after said first switching means to connect one conductor of said transmission line to ground to short out any common-mode voltage on the stray capacitance of said one conductor, and third switching means operating during continued closure of said second switching means to connect both conductors of the transmission line respectively to said ungrounded input terminals of the amplifier to apply to the input circuit thereof the analog signal stored on the capacitor with any common-mode voltage on the other conductor of the transmission line attenuated at least by said large factor.

No references cited.

ROY LAKE, *Primary Examiner.*

E. C. FOLSOM, *Assistant Examiner.*